United States Patent [19]

Ougarane et al.

[11] Patent Number: 5,855,639
[45] Date of Patent: Jan. 5, 1999

[54] PROCESS FOR THE CONVERSION OF A GLASS FURNACE WITH THE AID OF A COMBUSTION WITH OXYGEN

[75] Inventors: Lahcen Ougarane, Montigny-Le-Bretonneux; Thierry Legiret, Toussus-Le-Noble, both of France

[73] Assignee: L'Air Liquide, Societe Anonyme pour l'Etude et Exploitation des Procedes Georges Claude, Paris, France

[21] Appl. No.: 856,475

[22] Filed: May 14, 1997

[30] Foreign Application Priority Data

May 14, 1996 [FR] France ................. 96 06013

[51] Int. Cl.$^6$ ................. C03B 5/235
[52] U.S. Cl. ................. 65/134.4; 65/27; 65/135.1; 65/335; 65/347; 65/157; 431/8; 432/3; 432/19
[58] Field of Search ................. 65/27, 134.4, 134.1, 65/136.3, 135.1, 157, 171, 172, 335, 347; 432/3, 19, 20, 94; 431/8, 10

[56] References Cited

U.S. PATENT DOCUMENTS

| | | |
|---|---|---|
| 2,800,175 | 7/1957 | Sharp . |
| 3,592,623 | 7/1971 | Shepherd ................. 65/134.4 |
| 5,116,399 | 5/1992 | Lauwers . |
| 5,158,590 | 10/1992 | Jouvaud et al. . |
| 5,242,296 | 9/1993 | Tuson et al. . |
| 5,779,754 | 7/1998 | Bodelin et al. ................. 65/134.4 |

FOREIGN PATENT DOCUMENTS

| | | |
|---|---|---|
| 447300 | 9/1991 | European Pat. Off. . |
| 508139 | 10/1992 | European Pat. Off. . |
| 546238 | 6/1993 | European Pat. Off. . |
| 2728254 | 6/1996 | France . |
| 90/12760 | 11/1990 | WIPO . |

OTHER PUBLICATIONS

*Ceramic Engineering and Science Proceedings*, vol. 7, No. 3/4, 1986, pp. 545–533, R. Bansal et al., "Low Cost Pressure Swing Adsorption (PSA) Oxygen Systems for Oxygen Enrichment of Glass Furnaces".

*Primary Examiner*—Steven P. Griffin
*Attorney, Agent, or Firm*—Burns, Doane, Swecker & Mathis, L.L.P.

[57] ABSTRACT

Provided is a process for the production of a loop-shaped flame in a glass furnace. The furnace includes, in a rear part, a glass melting zone heated by injecting through at least one port a fuel gas and an oxidizer gas having more than 50 vol % of oxygen and, in a front part, a glass refining zone. The process involves defining a stoichiometry coefficient Ks of the flame in the melting zone or the refining zone according to the following formula:

$$Ks = \frac{\text{real oxygen volume injected into the zone being considered}}{\text{stoichiometric oxygen volume for the zone being considered}}$$

The oxidizer gas and the fuel gas injected through at least the first port are adjusted to obtain a stoichiometry coefficient Ks in the glass melting zone equal to at most 0.8. A fuel-oxidizer mixture is injected into the refining zone to obtain a stoichiometry coefficient Ks in the refining zone which is greater than the stoichiometry coefficient Ks in the melting zone and which is between 0.8 and 1.5. An oxidizer gas is injected into the melting zone in the vicinity of a fume discharge zone to obtain a quantity of oxygen in the fumes of between 0.5 and 3% by volume. The invention has particular applicability to end-fired furnaces with recuperators in which the blocking of the recuperator makes it necessary to employ ports with oxygen during the blocking of the recuperator, to maintain output at an acceptable volume.

13 Claims, 2 Drawing Sheets

PROCESS FOR THE CONVERSION OF A GLASS FURNACE WITH THE AID OF A COMBUSTION WITH OXYGEN

BACKGROUND OF THE INVENTION (1) Field of the Invention

The present invention relates to glass furnaces, especially end-fired furnaces with a recuperator or with regenerators. It relates more particularly to a process and a system for a glass furnace, especially an end-fired furnace provided with a recuperator which makes it possible to maintain the output efficiency of the glass furnace when there is a failure of the recuperator or of the regenerator and throughout the period of its blocking.

(2) Description of the Related Art

A glass furnace is usually supplied with energy through the intermediary, in particular, of so-called "air-fuel" ports into which a mixture of air and of fuel, such as natural gas, fuel oil or the like, is injected. These furnaces usually have at least one recuperator or regenerator which allows air to be preheated before it is injected into the ports. When the recuperator or regenerator of the furnace is defective or damaged, this furnace being normally heated with air ports, it is no longer possible to preheat sufficiently the air injected into these ports, and the energy consumption in the ports increases. Sometimes the energy contributed by the flame is no longer sufficient and cold spots are found on or in the bath of glass, which are highly detrimental to the quality of the glass produced and to the yield of the furnace.

The blocking of a recuperator in a furnace can demand several weeks or several months and during this period of blocking the production of glass in the furnace must be continued. The problem presented consists therefore in finding a means for replacing the function of the recuperator while employing, if possible, less energy than when the furnace is in normal operation with its recuperator.

Glass furnaces can be classified into various categories according, in general, to the type of glass manufactured and its use downstream of the melting and refining furnace. Glass furnaces for the manufacture of glass fibers generally comprise one or several recuperators which recover heat from the fumes by heat exchange with the air entering the furnace to feed the ports. These furnaces are generally furnaces in which the heating/melting of the glass charge takes place by virtue of a plurality of ports arranged in the side walls of the furnace.

Another type of furnace consists of so-called regenerative furnaces, which comprise at least two regenerators operating alternately in time:

Before being discharged to the atmosphere, the fumes pass through these regenerators and transfer part of the heat to refractory walls placed as a chicane in the regenerator. Every 20 to 30 minutes the ports and the regenerators are generally switched so that the regenerator which previously carried the hot fumes from the ports carries the cool air which feeds the ports and vice versa. This cool external air is thus heated in contact with the walls of the regenerator.

There are essentially two types of regenerative furnaces: those of the type with transverse ports which comprise series of ports in the side walls of the furnace with a regenerator facing each of them, and those of the end-fired type, which comprises two adjacent regenerators situated in the upstream part of the furnace (in relation to the flow of the glass charge), generally with one or more fuel injectors situated under the opening of each regenerator which opens into the furnace, with the result that the fumes from the flames produced by the burning of the fuel and of the preheated air are recovered in the other regenerator, and vice versa when the switching from one system of ports to the other takes place (every 20 to 30 minutes).

The present invention relates essentially to these latter regenerative furnaces of the end-fired type.

More details on glass furnaces can be found, for example, in the work entitled "Glass Furnaces—Design, Construction and Operation"—Society of Glass Technology—1987—by Wolfgang Trier.

Many documents in the art describe the use of oxygen-fuel ports in glass furnaces, either supplementing existing ports, or as a replacement for said ports.

For example, European Application EP-A-0,447,300 in the name of the Applicant Company, discloses a process for melting and refining in a glass furnace of end-fired type, in which at least one port of oxygen-fuel type is added in the glass refining zone, said port being of the type in which a so-called "pulsed" combustion is performed on the fuel or the oxidizer, so as to reduce the production of NOx in the fumes.

U.S. Pat. No. 5,116,399 describes a process for melting glass in an end-fired furnace which comprises only one oxygen-fuel additional port situated in the glass-refining zone in the middle of the front wall of the glass furnace, pointing toward the melt, so as to keep the unmelted material substantially on this side of the array of the bubblers which separate the melting zone from the refining zone. For this purpose the gases of the flame issuing from this additional port must have a speed of at least 100 m/s, which makes it a so-called "high-impulse" flame which has, in particular, a major disadvantage, when thrown forward at the limit of the melt, of causing the projection of unmelted glass particles.

Among the documents cited above and relating to regenerative glass furnaces of the end-fired type, none relates to the operation of such a furnace without regenerators, that is to say none concerns in particular the problem of the operation of this furnace during the blocking of the regenerators.

Similarly, the publicity document entitled "Glassman Europe '93—Presented at Glassman Europe '93 Lyon—France—Apr. 28, 1993" by G. B. Tuson, H. Kobayashi and E. J. Lawers is completely silent on this problem.

In particular, the problem which the inventors have had to solve, after having contemplated employing flames in which the oxidizer contains more oxygen than air does, and preferably more than 50 vol % of oxygen, consisted in keeping the flame loop-shaped, that is to say heating substantially the whole surface of the bath of glass: this loop shape is relatively easy to produce when air is employed, but this is found to be difficult when the oxidizer is pure or substantially pure oxygen (that is to say containing preferably more than 88 vol % of oxygen) and when the speed of injection of the oxygen or of the oxidizer gas remains low and generally does not exceed 60 m/s (for example in the case of oxygen supplied either from a stock vessel of liquid oxygen or from a low-pressure adsorption system of the VSA (Vacuum Switch Adsorption) type), but when the speed of the fuel gas is high (that is to say in particular when the ratio of the speeds of the fuel and of the oxidizer is higher than 1). The speed of the fuel gas, often higher than 100 m/s, then causes rapid oxidizer/fuel mixing and hence a shortening of the flame which then loses its loop shape. (The higher the speed of the fuel gas is than that of the oxidizer gas, the more the mixing of the two tends to take place rapidly).

SUMMARY OF THE INVENTION

The process according to the invention for the production of a loop-shaped flame in a glass furnace of the "end-fired" type comprising in its rear part a glass melting zone heated by means of at least one first port fed with fuel and with oxidizer comprising more than 50 vol % of oxygen and, in its front part, a glass refining zone, in which process stoichiometry coefficient Ks of the flame in a zone of the furnace is defined, equal to the ratio:

$$Ks = \frac{\text{real oxygen volume injected into this zone}}{\text{stoichiometric oxygen volume}}$$

is one in which the injections of oxidizer and fuel gas are adjusted in at least the first port so as to obtain a value of the coefficient Ks in this zone equal to at most 0.8, in which a fuel-oxidizer mixture is injected into the refining zone so as to obtain a stoichiometry coefficient Ks in this zone the value of which is higher than its value in the melting zone and is between 0.8 and 1.5, and in which essentially only oxidizer gas is injected into the melting zone situated in the vicinity of the fume discharge zone, so as to obtain a quantity of oxygen in the fumes of between 0.5 and 3% by volume.

According to another aspect of the invention, the process for temporary conversion of a glass furnace of the "end-fired" type comprising means for recovery of the heat of the burnt gases, at least one air-fuel port placed in the rear part of the furnace and creating a flame above the bath of glass which has the shape of a loop extending above the glass melting zone and the refining zone as far as the proximity to the front wall of the furnace, bounding the glass refining zone, then returning above the melting zone toward the rear part of the furnace, at least two zones for charging unmelted glass, situated in proximity to the rear wall of the furnace and in the glass melting zone, is one in which during the repair to the means of recovery of the heat of the burnt gases said means of recovery are closed so as to avoid any flow of fumes, in which at least one first port fed with fuel and oxidizer comprising at least 50 volume % of oxygen is installed in the place of at least one existing air-fuel port, in which the fumes are discharged through the intermediacy of at least one of the zones for charging glass, in which a means of injection fed with fuel and oxidizer comprising at least 50 volume % as oxygen is installed in the glass refining zone and in which at least one means of injecting oxidizer gas comprising at least 50% of oxygen is installed in the side wall of the furnace situated in the melting zone in proximity to the fume discharge zone, so as to create a flame which is loop-shaped, in which the value of the stoichiometry coefficient Ks in a zone of the furnace:

$$Ks = \frac{\text{real oxygen volume injected into this zone}}{\text{stoichiometric oxygen volume}}$$

is lower than 0.8 in the glass melting zone fed by at least the first port and is between 0.8 and 1.5 in the refining zone of the furnace.

According to a preferred embodiment, the invention is one in which the oxidizer gas is oxygen of a purity equal to or higher than 88 volume %, injected at a speed of between 10 m/s and 150 m/s.

According to another embodiment, the invention is one in which the oxidizer gas is produced by an apparatus for separating the gases of air with adsorption of the PSA or VSA type, producing oxygen.

According to an alternative form of embodiment, the invention is one in which the ratio of the speeds of injection of the fuel gas and oxidizer gas during their injection into the furnace is higher than or equal to 1.

According to another embodiment, the invention is one in which the stoichiometry ratio Ks in the refining zone of the furnace is between approximately 0.5 and 0.8.

According to a preferred embodiment, the invention is one in which the stoichiometry ratio Ks in the refining zone of the furnace is of the order of approximately 1.3.

The quantity of oxygen in the fumes after injection of oxidizer gas is preferably equal to approximately 1.5% by volume.

Preferably also the ratio Ks in the melting zone is approximately 0.65.

The quantity of oxygen by volume injected into the glass melting zone, with the exception of the fume discharge zone, is preferably approximately 40% of the total quantity of oxygen by volume which is injected into the furnace.

The quantity of oxygen by volume injected into the glass refining zone is preferably approximately 50% of the total quantity of oxygen by volume injected into the furnace.

According to another embodiment of the invention the quantity of oxygen by volume injected into the fume discharge zone is approximately 10% of the total quantity of oxygen by volume injected into the furnace.

It is also possible that, according to the invention, a fuel, generally in gaseous form, may be sent into the furnace with the unmelted glass and the quantity of oxidizer gas which is injected into the furnace is adjusted so as to maintain substantially the stoichiometric ratios.

The stoichiometry coefficient Ks of a flame in a zone of the furnace is defined as follows:

$$Ks = \frac{\text{real oxygen volume injected into this zone}}{\text{stoichiometric oxygen volume}}$$

The real oxygen volume is the volume of oxygen really added into the zone being considered (melting, refining) through the intermediacy of a port and/or of one or more lances.

The stoichiometric oxygen volume is defined as being the volume of oxygen necessary for the complete combustion of the fuel injected into the zone being considered through the intermediacy of one or more ports or originating from the zone preceding the zone being considered. All these volumes are, of course, defined in similar conditions, preferably standard temperature and pressure conditions (20° C.—1 atmosphere).

The stoichiometric combustion ratio for natural gas is approximately 2 m$^3$ of oxygen per m$^3$ of natural gas. In the case of heavy fuel oil this ratio is approximately 2.4 m$^3$ of oxygen per m$^3$ of heavy fuel oil. In general, substantially 2 m$^3$ of oxygen are needed for a fuel of 10 kWh of LCV (lower calorific value).

BRIEF DESCRIPTION OF THE DRAWINGS

The invention will be understood better with the aid of the following examples of embodiment, given without any limitation being implied, together with the figures, which show.

DETAILED DESCRIPTION OF PREFERRED EMBODIMENTS

Figure 1:
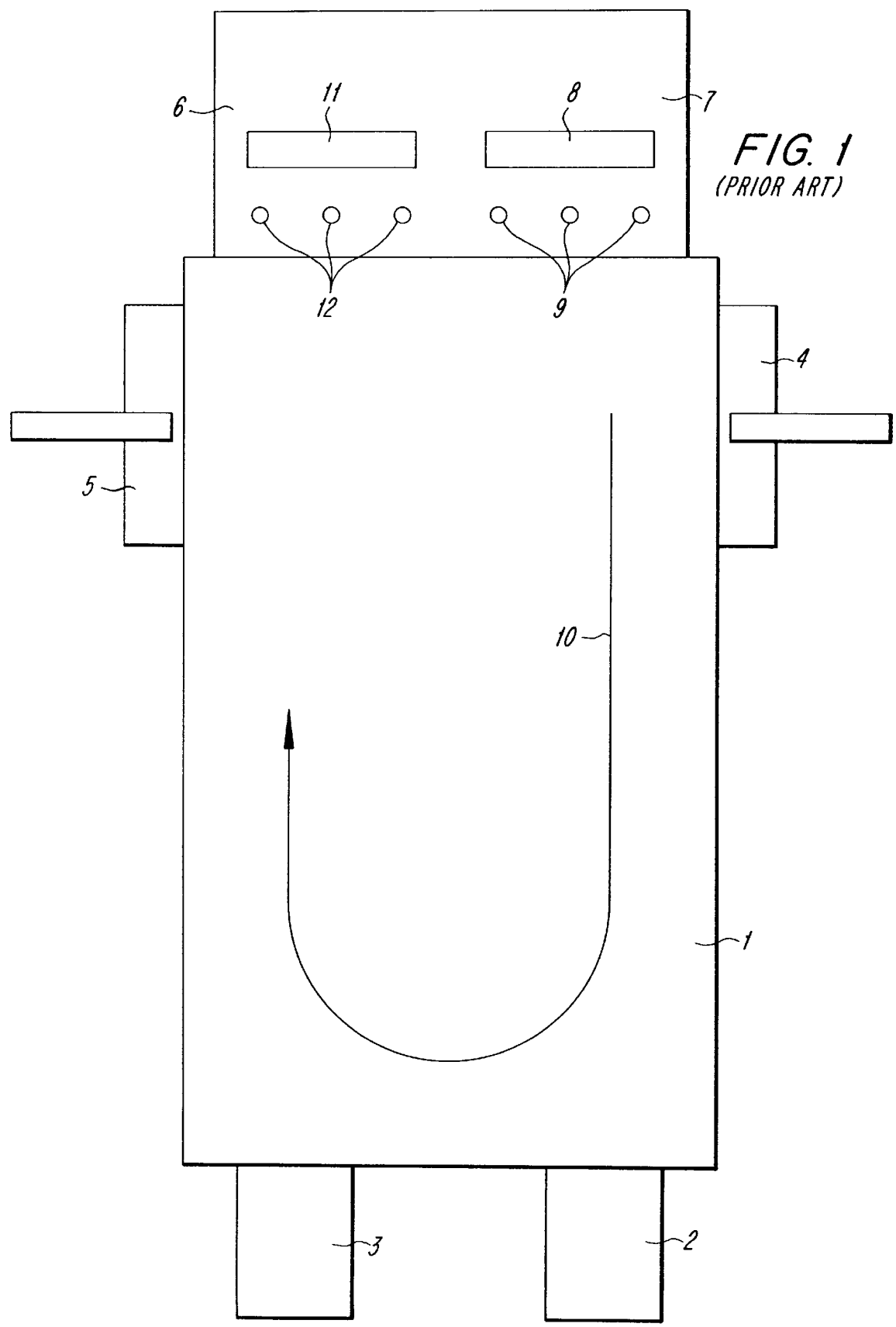
FIG. 1 a conventional diagram of an end-fired furnace with a recuperator for producing glass, according to the prior art.

FIG. 1 shows a diagrammatic top view of a glass furnace of "end-fired" type 1 of substantially rectangular shape, comprising two zones for lateral charging 4 and 5 of glass, in the rear part of the furnace, the molten glass flowing in the direction of the arrow 10 toward the channels 2 and 3, themselves connected to the feeds (or feeders) of the machines for forming the glass.

In the rear wall of the furnace are generally placed two generally identical units 6 and 7, each comprising an opening 8, 11, in communication with the regenerators (not shown in the figure) and a series of injectors for fuel 9, in general natural gas or optionally pulverized fuel oil.

Air preheated in the adjacent regenerator is injected into the opening 8 (or port) and burns with the fuel injected through the injectors 9, forming a U-shaped flame shown diagrammatically by the arrow 10, the fumes from which escape via the opening 11 and heat the adjacent regenerator. Every 20 to 30 minutes a reversal of the system is effected by employing air preheated in the regenerator adjacent to the opening 11 and fuel injected into the injectors 12 forming a U-shaped flame the fumes from which are discharged via the opening 8 and the regenerator adjacent to this opening 8 is heated again.

Figure 2:
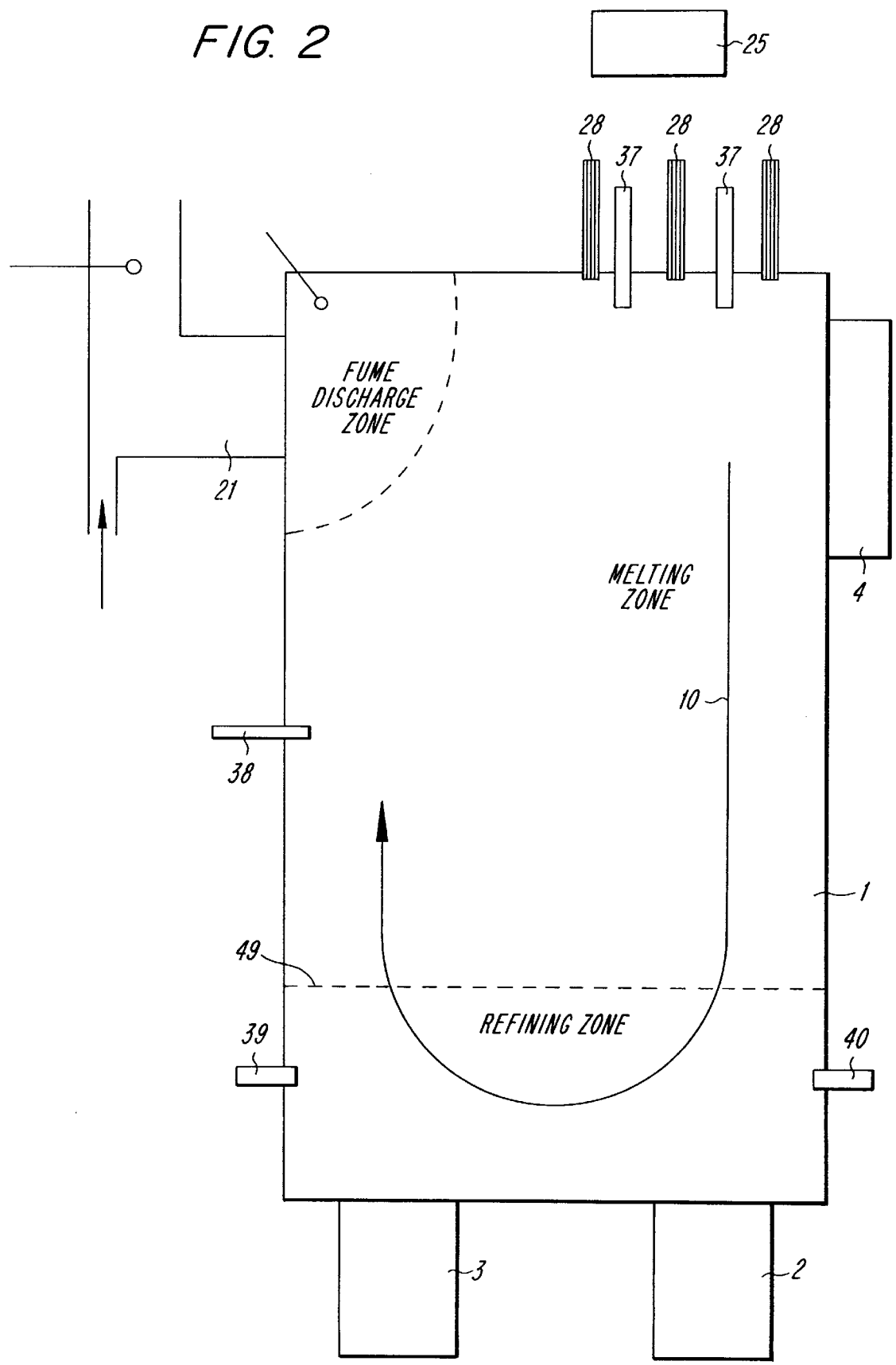
FIG. 2 shows a method of operation of the furnace of FIG. 1 in the absence of a recuperator, in which the combustion of the furnace is a combustion entirely with oxygen, according to the invention.

FIG. 2 shows an example of embodiment of the invention. In FIG. 2 the same components as those in FIG. 1 bear the same references.

Two oxygen lances 37 are placed between the three fuel injectors 28. To complete the combustion, two oxygen-fuel ports 39 and 40 are placed in the glass refining zone beyond the bubblers 49. Lastly, an oxygen lance 38 is envisaged before and in proximity to the fume discharge 21.

EXAMPLE 1

In this configuration oxygen lances 37 and oxygen-fuel ports 39 and 40, each with a nominal power of 500 kw have been employed so as to carry out this conversion of the furnace without its recuperator. A discharge for the fumes has been installed in place of one of the openings for charging glass, to allow the recuperator(s) to be isolated with a view to blocking.

This method has allowed the furnace to be maintained in production during the blocking of the recuperators.

Oxygen lances 37, two in number, are installed below the opening 25. They are surrounded by three natural gas injectors 28. The oxygen lances 37 and the natural gas injectors 28 are situated in different planes. The plane of the natural gas injectors is situated above that of the oxygen lances so as to form an oxidizing atmosphere, in this case.

If, on the other hand, the glass is to be melted under a reducing atmosphere, the gas injectors will be placed below the oxygen injectors. However, in all cases it is preferable to have oxidizer and fuel injection speeds which are not very different, in order to avoid rapid mixing (turbulences) and to obtain, on the contrary, a stagewise combustion. The ratio of the speeds of the oxidizer and of the fuel will be preferably nevertheless higher than 1, more preferably between 1 and 2.

The oxygen is introduced into the furnace in a subsonic regime at an angle of approximately between −15° and +15°. It is obvious that it is equally possible to install lances or injectors in the same plane.

A third oxygen lance 38 is installed near the furnace fume exit orifice 21 so as to complete the combustion and to avoid burning carbon monoxide in the gas discharge chimney. The natural gas is introduced at a speed which is preferably between 10 and 150 m/s. The oxygen injection preferably takes place in a subsonic regime in order to avoid, on the one hand, overheating at the root of the flame and, on the other hand, the development of hot spots on the wall of the furnace which is situated facing this flame, a hot spot which would then be due to too great an impulse of the flame.

In the glass refining zone are preferably installed two burners positioned substantially horizontally and pointing slightly toward the charging zone. ("Slightly" is intended to mean an angle of between approximately 0° and 10°).

The adjustment of the combustion is performed in the way shown in Table 1, that is to say that approximately 60% of the heating power is concentrated in the melting zone (which extends as far as the bubblers 49) with 40% by volume of the total oxygen injected into this melting zone, with a coefficient Ks of the order of 0.65 (between 0.5 and 0.8), 40% of the heating power concentrated in the refining zone with a coefficient Ks=1.3 (between 0.8 and 1.5) and 50 vol % of the total oxygen (or total oxidizer) injected into this refining zone and no power concentrated on the fume discharge zone, but with approximately 10% by volume of the total oxygen distributed into the furnace, injected via the lance 38, in proximity to the fume discharge opening in order to remove the combustible and polluting gases before the fumes are discharged. (More generally according to the complementary oxygen ratio as defined above).

The flame developed at the head of the furnace covers more than two-thirds of the surface of the glass bath. It is long and luminous by virtue of an incomplete combustion resulting from a cracking of the natural gas in the flame in the initial part of the combustion, followed by a reburning of the carbon particles thus generated. The energy and the oxygen introduced by the two ports situated in the refining zone make it possible to introduce the additional energy needed for the combustion and to maintain the loop shape of the resulting flame above the bath. A maximum covering of the surface of the bath is produced in this way.

The energy distribution and stoichiometry ratios Ks in the furnace are summarized in Table 1 below.

TABLE 1

| Position (zone) | Sum of the powers | Oxygen (volume) | Ks ratio |
| --- | --- | --- | --- |
| Melting zone | 60% | 40% | 0.65 (between 0.5 and 0.8) |
| Refining zone | 40% | 50% | 1.3 (between 0.8 and 1.5) |
| Fume discharge zone | 0% | 10% (*) | |

*Percentage of oxygen additional to the percentage of the furnace (melting and refining), to have a percentage of oxygen by volume in the fumes of between 0.5% and 3 vol % and preferably 1.5 vol %. In the case where there is another source of fuel in the furnace—other than the fuel delivered to the ports—oxygen must then be added in comparison to the percentages shown above, so as to obtain from 0.5 to 3 vol. % of oxygen in the fumes leaving the furnace.

The combustion in the furnace is dissymetrical, that is to say that the coefficient Ks changes along the flame. This combustion is preferably "stagewise" so as to lengthen the flame for a maximum covering of the surface of the melt bath.

By virtue of the results obtained it has been found that the specific consumption of the furnace has dropped by approximately 17% despite a lower furnace pull, while the glass quality produced is substantially identical to that produced before modification of the furnace.

We claim:

1. A process for the production of a loop-shaped flame in a glass furnace, the furnace comprising, in a rear part, a glass melting zone heated by injecting through at least one first port a fuel gas and an oxidizer gas comprising more than 50 vol % of oxygen and, in a front part, a glass refining zone, the process comprising:

defining a stoichiometry coefficient Ks of the flame in the melting zone or the refining zone according to the following formula:

$$Ks = \frac{\text{real oxygen volume injected into the zone being considered}}{\text{stoichiometric oxygen volume for the zone being considered}}$$

adjusting the oxidizer gas and the fuel gas injected through at least the first port to obtain a stoichiometry coefficient Ks in the glass melting zone equal to at most 0.8, wherein a fuel-oxidizer mixture is injected into the refining zone to obtain a stoichiometry coefficient Ks in the refining zone which is greater than the stoichiometry coefficient Ks in the melting zone and which is between 0.8 and 1.5; and injecting an oxidizer gas into the melting zone in the vicinity of a fume discharge zone to obtain a quantity of oxygen in the fumes of between 0.5 and 3 vol %.

2. The process according to claim 1, wherein the fuel gas and the oxidizer gas are injected into the furnace at respective speeds such that a ratio of injection speed of the fuel gas/oxidizer gas is greater than or equal to 1.

3. The process according to claim 1, wherein the stoichiometry coefficient Ks in the melting zone of the furnace is between approximately 0.5 and 0.8.

4. The process according to claim 1, wherein the stoichiometry coefficient Ks in the refining zone of the furnace is approximately 1.3.

5. The process according to claim 1, wherein the quantity of oxygen in fumes generated by the furnace after injection of oxidizer gas is equal to approximately 1.5 vol %.

6. The process according to claim 1, wherein the ratio Ks in the melting zone is approximately 0.65.

7. The process according to claim 1, wherein the quantity of oxygen by volume injected into the glass melting zone, with exception of the fume discharge zone, is approximately 40% of the total quantity of oxygen by volume injected into the furnace.

8. The process according to claim 1, wherein the quantity of oxygen by volume injected into the glass refining zone is approximately 50% of the total quantity of oxygen by volume injected into the furnace.

9. The process according to claim 1, wherein the quantity of oxygen by volume injected into the fume discharge zone is approximately 10% of the total quantity of oxygen by volume injected into the furnace.

10. The process according to claim 1, wherein the quantity of the oxidizer gas injected into the furnace is adjusted to substantially maintain the stoichiometric coefficient Ks in the glass melting zone and the glass refining zone.

11. A process for temporary conversion of an end-fired glass furnace, the furnace comprising means for recovering heat from gases burnt in the furnace, at least one air-fuel port disposed in a rear part of the furnace for creating a flame above a bath of glass, the flame having the shape of a loop extending above a glass melting zone and a glass refining zone to in proximity to a front wall of the furnace, bounding the glass refining zone, and then returning above the glass melting zone toward the rear part of the furnace, and at least two zones for charging unmelted glass, said at least two zones being disposed in proximity to the rear wall of the furnace and in the glass melting zone, the process comprising:

during repair of the means for recovering heat, closing said means to avoid any flow of fumes;

installing in place of the at least one air-fuel port, at least one first port fed with a fuel and an oxidizer comprising at least 50 vol % of oxygen;

discharging fumes through the intermediacy of at least one of the zones for charging glass as a fume discharge zone;

installing a means of injection fed with a fuel and an oxidizer gas comprising at least 50 vol % of oxygen in the glass refining zone, and at least one means of injection fed with an oxidizer gas comprising at least 50 vol % of oxygen in a sidewall of the furnace disposed in the glass melting zone in proximity to the fume discharge zone, thereby creating a flame which is loop-shaped, wherein a stoichiometry coefficient Ks in the glass melting zone and the glass refining zone, defined by the following formula:

$$Ks = \frac{\text{real oxygen volume injected into the zone being considered}}{\text{stoichiometric oxygen volume for the zone being considered}}$$

is lower than 0.8 in the glass melting zone fed by at least the first port and is between 0.8 and 1.5 in the glass refining zone.

12. The process according to claim 11, wherein the oxidizer gas is oxygen of a purity greater than or equal to 88 vol %, and is injected at a speed of between 10 and 150 m/s.

13. The process according to claim 11, wherein the oxidizer gas is produced by a PSA or VSA apparatus for separating the gases of air with adsorption, thereby producing oxygen.

* * * * *